United States Patent
Maltz et al.

(10) Patent No.: US 6,587,634 B2
(45) Date of Patent: Jul. 1, 2003

(54) PAGING DURING MEDIA LOADING

(75) Inventors: Andrew H. Maltz, Sherman Oaks, CA (US); John T. Hurst, Burbank, CA (US); William E. Elswick, Santa Monica, CA (US)

(73) Assignee: Avica Technology Corporation, Santa Monica, CA (US)

( * ) Notice: Subject to any disclaimer, the term of this patent is extended or adjusted under 35 U.S.C. 154(b) by 299 days.

(21) Appl. No.: 09/784,948

(22) Filed: Feb. 15, 2001

(65) Prior Publication Data

US 2002/0164956 A1 Nov. 7, 2002

(51) Int. Cl.[7] .................................................. H04N 5/91
(52) U.S. Cl. .......................... 386/46; 455/420; 340/7.1
(58) Field of Search ........................... 386/46, 125–126; 455/418, 419, 420; 340/7.1, 7.2; H04N 5/91

(56) References Cited

U.S. PATENT DOCUMENTS

| | | | | |
|---|---|---|---|---|
| 5,016,273 A | * | 5/1991 | Hoff | 386/46 |
| 5,280,515 A | * | 1/1994 | Nagatsu | 348/14.08 |
| 5,335,246 A | * | 8/1994 | Yokev et al. | 340/7.2 |
| H1782 H | * | 2/1999 | Wicks et al. | 340/7.2 |
| 5,905,865 A | * | 5/1999 | Palmer et al. | 725/112 |

* cited by examiner

*Primary Examiner*—Vincent Boccio
(74) *Attorney, Agent, or Firm*—Mitchell Silberberg & Knupp LLP

(57) ABSTRACT

Provided are systems and methods for facilitating loading of data from a portable medium into a device. Initially, a portable medium encoded with data is accepted and the data from the portable medium is loaded into a mass storage device. A paging signal is caused to be wirelessly transmitted when a specified portion of such loading has been completed.

17 Claims, 3 Drawing Sheets

PAGING DURING MEDIA LOADING

BACKGROUND OF THE INVENTION

1. Field of the Invention

The present invention relates to data, such as programming content, from a portable medium, such as a DVD or a CD, into a computer, a player or any other type of device.

2. Description of the Prior Art

Due to the large size of a composition of programming content or other data, it is often necessary to load such content onto a player or other device by sequentially inputting multiple diskettes, CDs (compact discs) or DVDs (digital versatile discs or digital video discs) into the device. As used herein, programming content is intended to mean a software program for execution on a computer or content for playing on an electronic device, such as content to play an audiovisual (i.e., audio, video or combined audio and video) program. Thus, examples of programming content include: computer software for any purpose, digital motion pictures, video game programming, or any similar types of programming content.

Loading the content from each such individual medium often can require a significant amount of time. Nevertheless, in order to complete the loading in the least amount of time, the user typically is required to simply wait for the loading of each disc to finish before inputting the next one. Clearly, this conventional approach can be highly inefficient.

SUMMARY OF THE INVENTION

The present invention addresses this need by providing methods and apparatuses that cause a paging signal to be wirelessly transmitted to indicate loading status.

Thus, in one aspect the invention is directed to a technique for facilitating loading of data from a portable medium into a device. Initially, a portable medium encoded with data is accepted and the data from the portable medium is loaded into a mass storage device. A paging signal is caused to be wirelessly transmitted when a specified portion (which may be pre-specified or user-selectable) of such loading has been completed. For example, a paging signal may be transmitted when loading has completed or when a specified percentage of loading has completed.

By virtue of the foregoing arrangement, it often becomes unnecessary for an individual to wait while content from a medium is being loaded into a device. This is particularly critical where a loading operation requires loading content from multiple media. According to the present invention, an individual might install the first medium, go away, and then return to install the second medium only after receiving a page message that the first medium has completed or has almost completed loading.

In addition to the foregoing, a paging message may be sent in an event that a loading error occurs, during the playing of programming content, or in various other situations.

The foregoing summary is intended merely to provide a brief description of the general nature of the invention. A more complete understanding of the invention can be obtained by referring to the claims and the following detailed description of the preferred embodiments in connection with the accompanying figures.

DESCRIPTION OF THE PREFERRED EMBODIMENT(S)

This specification is related to a commonly-assigned application filed concurrently herewith and titled "Programming Content Distribution", which application is incorporated by reference herein as though set forth herein in full.

System Overview

Figure 1:
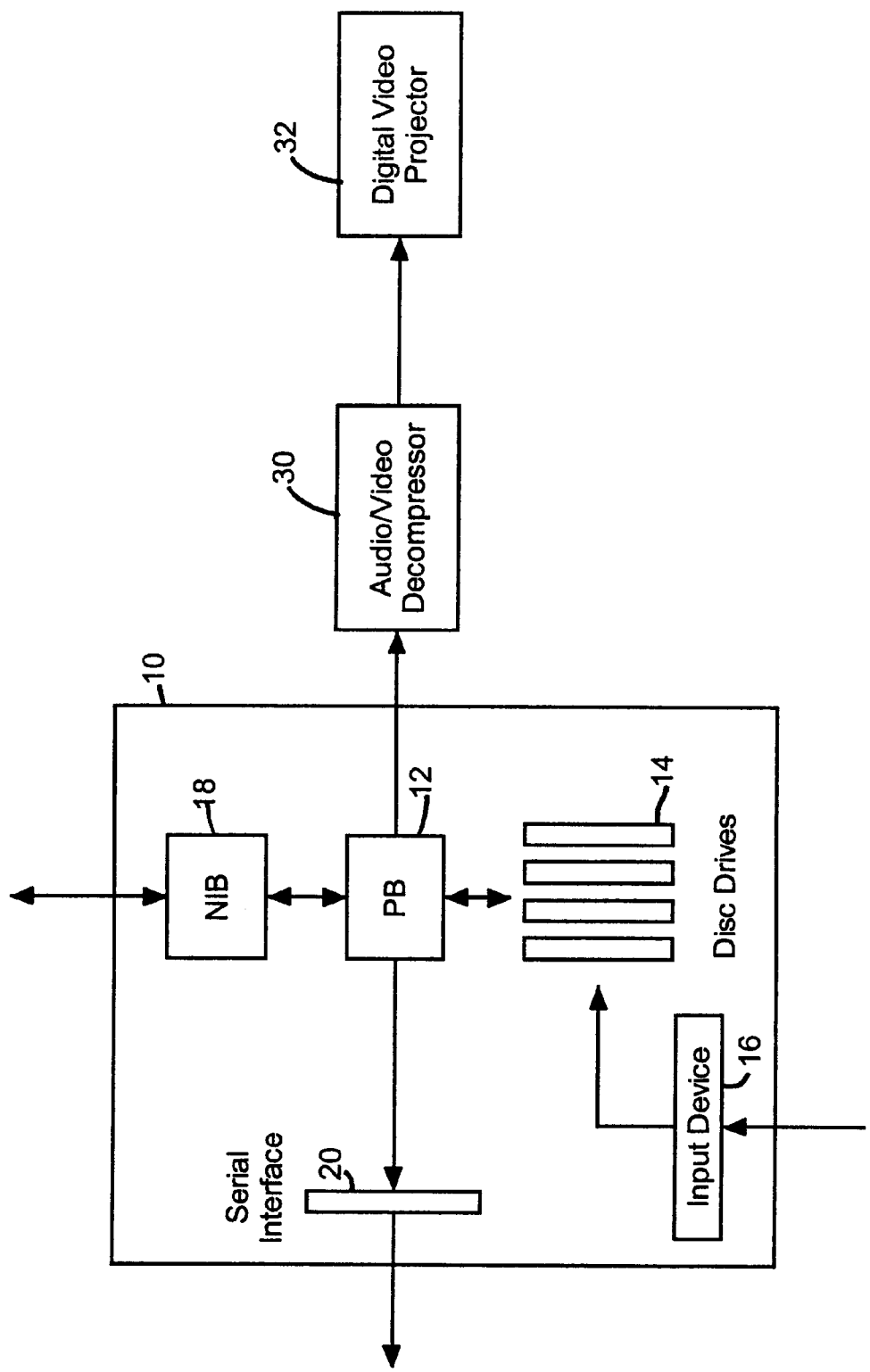
FIG. 1 is a block diagram illustrating an overview of a system according to a representative embodiment of the present invention.

FIG. 1 is a block diagram illustrating an overview of a system 10 according to a representative embodiment of the present invention. In the preferred embodiment of the invention, system 10 is a unit for storing and playing digital feature-length theater-quality motion pictures. However, for many of the purposes described herein system 10 may instead represent various other types of systems for playing and/or executing (either or both referred to herein as "playing") various other types of programming content.

Included in system 10 is a processor board 12, which preferably is an open-architecture microprocessor-based processor board. Processor board 12 preferably includes at least the following components: one or more central processing units (CPUs), read-only memory (ROM), random access memory (RAM), and input/output (I/O) circuitry for interfacing with other devices.

Connected to processor board 12 is a bank of disc drives 14. As noted above, system 10 preferably is capable of playing digital feature-length theater-quality motion pictures. Each such motion picture can require a storage capacity of 70 gigabytes (GB) or more. As a result, multiple hard disc drives are used. In addition, as system 10 is intended for use in a movie theater, reliability is critical. Therefore, it is preferable to provide for redundancy, such as by mirroring hard disc drives. It is noted that although magnetic discs are used for long-term mass storage in the present embodiment of the invention, any other (preferably nonvolatile) mass storage device(s) may instead be used.

Input device 16 allows content to be loaded into disc drive bank 14 from portable physical media. Thus, input device 16 may comprise one or more DVD drives, CD drives and/or any other input devices. In the embodiment illustrated in FIG. 1, data read by input device 16 are directly input into disc drive bank 14. In this case, disc drive bank 14 preferably is provided with a separate controller (not shown) to prevent read/write conflicts between input device 16 and processor board 12. In an alternative embodiment of the invention, data read by input device 16 are first provided to processor board 12 and then stored by processor board 12 into disc drive bank 14.

Processor board 12 also communicates with network interface board 18, which interfaces with a local area network which, in turn, may be connected to a wide area network or the Internet. In this manner, system 10 can send and receive programming content to and from other devices, as described in more detail below.

During playback, processor board 12 reads programming content from disc drive bank 14, and then outputs the content to an external audio/video decompressor 30 which, in turn, provides decompressed audio and video to a digital video projector 32. Processor board 12 also provides control signals (e.g., for opening curtains, changing lighting settings) via serial interface 20. Such control signals may be stored as part of the programming content or as part of the manifest file (see below) in disc drive bank 14. Alternatively, such signals may be originated by processor board 12, e.g., in the event that certain pre-specified criteria exist in the EventList being played (see below).

In addition to storing programming content to be played by system 10, disc drive bank 14 may also store computer-executable process steps for execution by processor board 12, particularly, process steps for implementing the methods and techniques of the present invention described in more detail below. In this case, the process steps generally will be first downloaded into RAM on processor board 12 (or into extension RAM) and then executed by a CPU on processor board 12 out of such RAM. Alternatively, some or all of such process steps may be stored on ROM and executed directly out of ROM.

Although not shown in FIG. 1, it should be understood that system 10 may include other components, as well, depending upon the needs of the user, such as a display (e.g., a cathode ray tube or liquid crystal display), other output devices (e.g., a speaker or printer), one or more additional input devices (such as a mouse or other pointing device, keyboard, microphone or wireless remote control interface), a real-time clock, a removable storage read/write device (such as for reading from and/or writing to a magnetic disk, a magnetic tape, an opto-magnetic disk, an optical disk, or the like), and/or a modem (which may be configured to connect to the Internet or to any other computer network via a dial-up connection).

Programming Content Distribution

As indicated above, the programming content in the preferred embodiment of the invention comprises digital cinema. Each composition in digital cinema is made up of a number of different assets, which may be combined in different ways to provide different versions of the composition. For example, one version might include a base video and soundtrack, another might also include subtitles, another might replace the standard soundtrack with one that has foreign language dubbing, and so on. Thus, a distribution of programming content in this context might include sufficient assets to generate any number of versions of the composition. Ordinarily, the owner of the content will strictly control the versions that may be exhibited. However, in certain cases the exhibitor might be given some flexibility in customizing a version, such as the ability to select at least some of the trailers to be shown prior to the feature-length motion picture.

Assets used in digital cinema can vary in size and composition. However, feature-length productions generally will be tens of gigabytes in size, and may at exhibition time include picture, sound, subtitles and other types of content for one or more "versions" of the production, which may include alternate endings, foreign language sound tracks, and more. Often complicating the situation is the need for absolute security in the handling of these materials. This section discusses the terminology and issues that frame this subject, and describes a method for asset handling in digital cinema.

As used herein, the following terms will have the indicated meanings.

Extensible Markup Language (XML): An extensible language framework for encoding structured data.

Document Type Definition (DTD): A document which defines a legal set of elements (e.g., XML elements) for a particular class of document (e.g., XML document).

Universally Unique Identifier (UUID): A value that uniquely identifies an entity within an information processing system. In the preferred embodiment of the invention, the UUIDs are represented directly on a network as a string of 128 bits, and in text as a broken string of 32 hexidecimal characters (e.g., 8204b008-cc8c-11d4-8769-00a024042a23).

Composition: A collection of assets that form an exhibitable work, e.g., a motion picture. There may be several different versions of a composition.

Asset: A real or virtual production element. Two data files contain the same asset if they contain identical strings of bytes. Two copies of the same asset encrypted with different keys comprise two new assets.

Chunk: Chunking is the process by which a large asset or composition is divided into smaller pieces suitable for distribution. The simplest form of chunking is division of the source file into some number of chunk files without regard to any feature in the source file, for example, dividing an MPEG stream with embedded audio into n number of files of size S bytes each. Reassembly of such a file can be done easily, by concatenating the contents of the chunk files. More advanced forms of chunking may be used to isolate different types of content (such as sound and picture) into separate chunk files, and may use chunk file boundaries that are content-sensitive, such as beginning MPEG files with I-frames. Chunks created in this manner may be exhibited using EventLists tailored for a particular audience. For example, an exhibitor may show the same asset in two or more languages.

Manifest: A string (e.g., XML string) that contains data (e.g., metadata) associated with a composition or an asset that has been chunked, and may contain one or more EventLists.

EventList: A list of assets with associated parameters that specifies an ordered sequence of events, e.g., playing a sequence of trailers followed by a feature-length motion picture. EventLists may contain other EventLists, allowing modular expression of a sequence.

The distribution of material in a digital cinema system is influenced by a number of constraints and requirements, among them: file size, file integrity, conditional access, mass manufacturing of distribution media, network multicasting, inventory control, and auditing. The reasons for this complexity have to do with requirements, both real and imagined. For example, the most cost effective physical and electronic distribution mechanisms rely on sending the same content to multiple recipients, the more the better in fact. This places a real constraint on the definition of a secure packaging architecture because it generally requires either that the encryption scheme use the same key for multiple recipients, or that the encryption scheme must support multiple simultaneous keys for decryption.

Similarly, it is anticipated that exhibitors will want to have the flexibility of showing a composition in multiple versions (language, content) and in varying theaters (traffic) on an ad-hoc basis. This is an imagined requirement (no one knows exactly how exhibitors will use these features), but one that the present inventors believe will need to be accommodated. To support this requirement, asset encryption and encryption key management preferably is separate so that new rights may be granted without the need to retransmit gigabytes of assets.

Packaging a composition for distribution is assumed to begin with Mastering. The scope of this discussion will thus be limited to the realms of mastering, distribution, and exhibition. Although programming content may include any combination of computer-executable code and data, for purposes of chunking and distribution, such programming content may be generically referred to as data.

1. Mastering

A set of assets that forms a complete version of a composition are converted during the mastering process into one or more "digital intermediate" files, which generally have standard formats and standard resolutions (typically equal to or greater than the highest expected exhibition resolution). In order to produce a distribution copy of the composition (one that may be sent out for exhibition), the digital intermediate files are processed (such as by down-converting) to produce one or more output files.

In the preferred embodiment, compositions optionally can be distributed in such a way as to allow customization by the exhibitor within boundaries set by the composition owner (or the owner's designate). In these cases, additional assets are mastered and prepared for distribution. For each unique ordering of assets permitted by the composition owner, an EventList is generated which specifies that order. For example, if a composition is to be distributed in three languages and two video formats, a maximum of six EventLists will need to be created.

The file sizes produced by the tools in the mastering environment may be greater than the maximum size allowed by the distribution channel (discussed in more detail below). Such files are split into smaller files to accommodate distribution. In addition, supporting the reassembly of custom versions during exhibition generally requires that any process for splitting files should be sensitive to file content in order to allow for clean splicing during playback. In the simple case, where there is only one version of the composition consisting of a single composite content stream, files that exceed a size limit may be simply divided into smaller (e.g., same-sized) files without regard to content. To simplify the discussion, we will consider simple splitting of composite streams. However, similar concepts will apply when using more advanced, content-aware, splitting criteria.

Figure 2A:
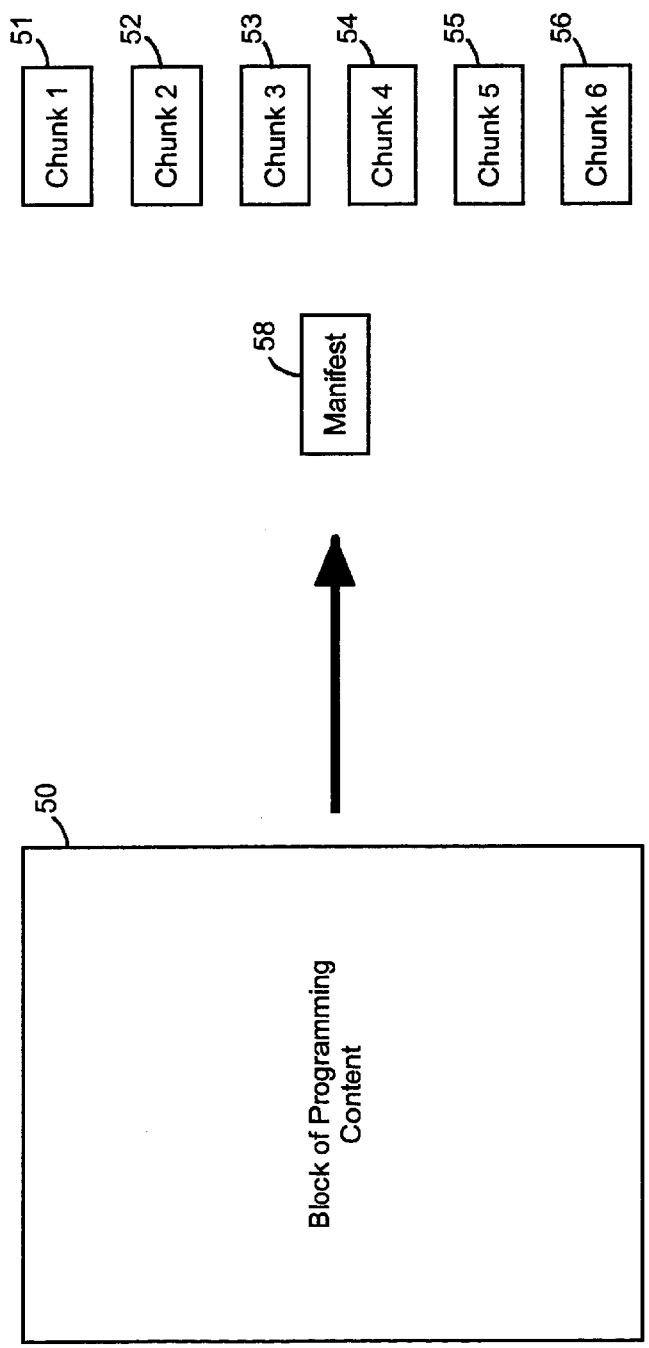
FIGS. 2A and 2B illustrate division of a large block of programming content into chunk files and creation of a manifest file according to a representative embodiment of the present invention.

FIG. 2A illustrates chunking of a block of programming content 50. It is noted that programming content 50 may be an entire composition (e.g., in the case of a composite audio/video stream) or may be just one asset in a composition. The chunking process in the present case involves dividing block 50 into smaller chunks of data 51 to 56, such that chunks 51 to 56 together include all of the data in programming content block 50. In the case that block 50 comprises a composite stream, chunking may involve merely segmenting block 50 at the appropriate points to provide chunks of the desired sizes. Alternatively, as noted above, more complicated chunking may instead be performed.

Figure 2B:
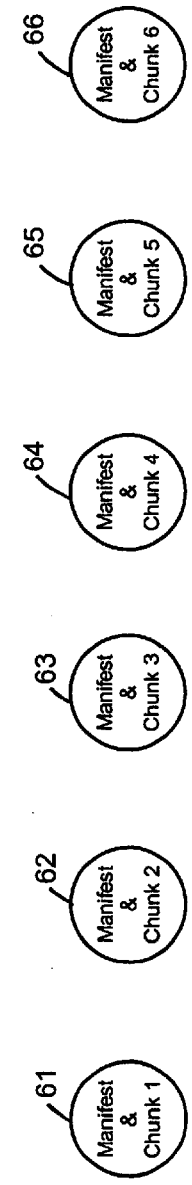

In any event, a chunk file (including a header) is created for each chunk and a manifest file 58 is generated that lists the chunks and indicates how to assemble the chunks to reproduce block 50. As shown in FIG. 2B, if the programming content 50 is to be distributed on physical media, then preferably each medium 61 to 66 includes one or more chunk files and a copy of the manifest file.

a. Chunk Files

The complete set of chunks, once properly sized, is packaged into chunk files that are labeled for distribution. Each chunk file contains a header (preferably in the form of an XML string) which identifies the contents of the chunk. As illustrated below, each chunk file preferably carries a UUID and audit information, as well as format and content identification.

b. Chunk File Format

The preferred format for a chunk file is as follows:

TABLE 1

| Field Name | Data Type/Size | Description |
| --- | --- | --- |
| Signature | Unsigned int, 32 bits, big endian. | "Magic Cookie" identifies the file format. The value of this cookie preferably is 0xadc0 |
| XMLPoint | Unsigned int, 32 bits, big endian. | Pointer to the start of the XML header in the file |
| PayloadPoint | Unsigned int, 32 bits, big endian. | Pointer to the start of the payload in the file |
| PayloadLength | Unsigned int, 32 bits, big endian. | Size of the payload in bytes |
| XMLHeader | Variable number of bytes of UTF-8 encoded XML | The chunk file header, as described below, followed by one or more NULL bytes (0x00) up to the start of the payload |
| Payload | PayloadLength bytes | The chunk of data being carried by this chunk file |
| padding | Variable number of bytes | Zero or more bytes to pad the file to a desired size. The currently preferred chunking routine inserts no padding. | c. Chunk XML Header Format

The metadata for the chunk file preferably is stored in XML as a set of name-value pairs. A preliminary DTD is given below, followed by an example and description of the tags as currently defined. Since the contents of the XML header will probably change over time, it is preferred that implementations treat unknown tags as no-ops.

i. Chunk XML Header DTD

```
<!ELEMENT   Chunk          (ID, Composition, CreationDate, Creator, Sum,
                            Title?, Reel?, MediaType?, Language?)>
<!ATTLIST   Chunk          Version        CDATA        "1.0">
<!ELEMENT   ID             (#PCDATA)>
<!ELEMENT   Sum            (#PCDATA)>
<!ATTLIST   Sum            Type           (MD5 | SHA)  "MD5">
<!ELEMENT   Composition    (#PCDATA)>
<!ELEMENT   CreationDate   (#PCDATA)>
<!ATTLIST   CreationDate   TZ             CDATA        #REQUIRED>
<!ELEMENT   Creator        (#PCDATA)>
<!ELEMENT   Title          (#PCDATA)>
<!ELEMENT   Reel           (#PCDATA)>
<!ELEMENT   MediaType      (#PCDATA)>
<!ELEMENT   Language       (#PCDATA)>
``` ii. Chunk XML Header Example

```
<Chunk Version="0.1">
    <ID>5f6f4667-9d3b-4863-94db-a0bfdf5b1ddd</ID>
    <Sum Type="MD5">e68f39a117bb9f75c2d310bc57451a9f</Sum>
    <Composition>8204b008-cc8c-11d4-8769-00a024042a23</Composition>
    <CreationDate TZ="PDT">2000-12-05-00:00:00</CreationDate>
    <Creator>7435238d-8425-4aab-b6f3-e33aa61a2e43</Creator>
    <Reel>1AB_0001</Reel>
    <MediaType>video/smpte-1080-24p</MediaType>
    <Title>Gone with the Wind</Title>
</Chunk>
``` iii. Chunk XML Header Element Descriptions

TABLE 2

| Name | Contents | Description |
|---|---|---|
| ID | UUID | Unique identifier of the chunk |
| Sum | 32 hexidecimal characters, case insensitive | Checksum or message digest of the payload section of the chunk file |
| Composition | UUID | Unique identifier of the composition this chunk is extracted from |
| CreationDate | YYYY-MM-DD-HH:MM:SS | Timestamp recording the moment the chunk was created |
| Creator | UUID | Unique identifier of the entity that created the chunk |
| Reel | text | Composition owner's designation of chunk contents. |
| MediaType | type/subtype (text) | Identifies the encoding of the chunk payload, ala MIME. |
| Title | text | The name or title of the composition or asset (optional) |
| Language | text | Language code for chunks having language distinctions. | d. Manifest File

Once an asset (or composition) has been divided into chunk files, a manifest file is written which records the list of chunks created. The manifest can be used by intermediate delivery systems to ensure the delivery of complete file sets, and prior to exhibition to guide the reassembly of the original asset. The manifest preferably is an XML file. A sample DTD is given below, followed by an example and description of the tags currently defined. Since the contents of the manifest will probably change over time, it is preferred that implementations treat unknown tags as no-ops.

i. Manifest File DTD

| | | | | |
|---|---|---|---|---|
| <!ELEMENT | Manifest | (ID, Composition, CreationDate, Creator, ChunkList, Title?, Reel?, MediaType?, Language?)> | | |
| <!ATTLIST | Manifest | Version | CDATA | "1.0"> |
| <!ELEMENT | ChunkList | (Chunk+)> | | |
| <!ELEMENT | Chunk | (ID, Sum)> | | |
| <!ELEMENT | ID | (#PCDATA)> | | |
| <!ELEMENT | Sum | (#PCDATA)> | | |
| <!ATTLIST | Sum | Type | (MD5 \| SHA) | "MD5"> |
| <!ELEMENT | Composition | (#PCDATA)> | | |
| <!ELEMENT | CreationDate | (#PCDATA)> | | |
| <!ATTLIST | CreationDate | TZ | CDATA | #REQUIRED> |
| <!ELEMENT | Creator | (#PCDATA)> | | |
| <!ELEMENT | Title | (#PCDATA)> | | |
| <!ELEMENT | Reel | (#PCDATA)> | | |
| <!ELEMENT | MediaType | (#PCDATA)> | | |
| <!ELEMENT | Language | (#PCDATA)> | | | ii. Manifest File Example

```
<Manifest>
    <ID>8204b008-cc8c-11d4-8769-00a024042a23</ID>
    <Sum Type="MD5">7f5d02aa26415617bdc4fcee83b20ffb</Sum>
    <Composition>8204b008-cc8c-11d4-8769-00a024042a23</Composition>
    <CreationDate TZ="PDT">2000-12-05-00:00:00</CreationDate>
    <Creator>7435238d-8425-4aab-b6f3-e33aa61a2e43</Creator>
    <Title>Gone with the Wind</Title>
    <ChunkList>
        <Chunk>
            <ID>5f6f4667-9d3b-4863-94db-a0bfdf5b1ddd</ID>
            <SumType="MD5">6876e4a829d90c44a63b358c2155841a</Sum>
        </Chunk>
        <Chunk>
            <ID>34a18dfe-bf67-4e44-a0d0-fd2e13bef770</ID>
            <Sum Type="MD5">415ecf620f096786ae64eca46a3b67e0</Sum>
        </Chunk>
        <Chunk>
            <ID>1bd4ab8e-4a76-41c1-97fd-d756fa96ab36</ID>
            <Sum Type="MD5">eaa54b213fcc5062f9689dd2e13b57df</Sum>
        </Chunk>
        <Chunk>
            <ID>ec579d0f-b32a-437e-818a-5a29887434a4</ID>
            <Sum Type="MD5">b1ba46bc5ed712acdbc89b28266ee4e2</Sum>
        </Chunk>
    </ChunkList>
</Manifest>
``` iii. Manifest XML Element Descriptions

TABLE 3

| Name | Contents | Description |
|---|---|---|
| ID | UUID | Unique identifier of the Manifest |
| Sum | 32 hexidecimal characters | Checksum of the original file, before chunking. |
| Composition | UUID | Unique identifier of the composition this Manifest relates to |
| CreationDate | YYYY-MM-DD-HH:MM:SS | Timestamp recording the moment the Manifest was created |
| Creator | UUID | Unique identifier of the entity that created the Manifest |
| Title | text | The name or title of the composition or asset (optional) |
| ChunkList | XML Container | Contains a list of chunk elements |
| Chunk | XML Container | Represents a chunk, contains ID and Sum elements |
| ID | UUID | Unique identifier of the chunk |
| Sum | 32 hexadecimal characters | Checksum of chunk file, including headers | e. Packaging

In the event that programming content is chunked at the asset level, the corresponding manifest file describes how to reassemble the chunks to reproduce the asset. The manifest may also include one or more EventLists, each specifying the assembly of assets to create a version of a composition. However, more preferably, in this case composition metadata and one or more EventLists are written into a separate Package file, which is then distributed (either electronically or on physical media) and ultimately used by the player to play out the composition, as well as by the distribution system to ensure delivery of the complete set of assets needed to exhibit a composition.

2. Distribution

Distribution can be divided into two essential modes, delivery on physical media and electronic delivery. The chunking method described above is applicable to both modes, although parameters such as file size and encryption strength may be adjusted to suit a particular mode.

System 10 preferably can handle the reception of chunk files and the manifest file in any order. However, it is preferable that the manifest is received before the chunk files.

When distributing a chunked file via physical media, it is preferred that the following conventions are observed:

1. The manifest file should be named Manifest-<UUID>, where <UUID> is the UUID of the manifest itself.
2. When a set of chunks must be extended across two or more pieces of media, the manifest should exist on each piece (as shown in FIG. 2B).
3. A file named DiskLabel should be created on each disk in a set. The contents of the file preferably will consist of a string of ASCII characters of the form <i> of <n>, where <n> is the total number of disks in the set and <i> is the number of the disk on which the DiskLabel resides. The string preferably will be terminated by at least one whitespace character, such as a newline or carriage-return/newline.

3. Exhibition

In the present embodiment, simple chunking is performed. As a result, reassembly can be performed by simply concatenating the chunks in the order specified by the manifest. Other chunking techniques will require correspondingly different reassembly techniques. In particular, content-aware chunking might include the embedding of synchronization codes or tags for use in reassembling an asset or a composition according to an EventList.

4. Further Considerations

It is preferable to provide for a mechanism to verify the integrity of the manifest file and the associated chunk files. This preferably is accomplished by including in the manifest file a message digest for each chunk file and a message digest for the entire composition and by including in each chunk file a message digest for the corresponding chunk. As used herein, a message digest is a small amount of data that represents a larger block of data and can be used to check the integrity of the larger block. Examples include checksums, cyclic redundancy check (CRC) codes, and codes produced through the use of a hashing routine (e.g., MD5). In addition, as indicated above, it generally is desirable to encrypt all or part of the chunk files and the manifest file.

As indicated above use of a separate manifest file allows reassembly of the data chunks in the proper manner irrespective of the order in which the individual media are loaded into system 10 (in the event of physical distribution) or the order in which the chunk files are received by system 10 (in the event of electronic distribution. This combination of providing a message digest at the chunk level and also providing a separate manifest file that describes how to assemble the data chunks is believed to provide for more efficient distribution of programming content.

By utilizing a manifest file in this manner, it is possible to reconstruct a block 50 of programming content irrespective of the order in which the individual chunks 51 to 56 are received or loaded into system 10. Such reconstruction may be performed in advance (e.g., at the time of receipt) or may be performed on-the-fly during exhibition.

Once the chunk files have been received and loaded into system 10, it is preferable that each chunk 51 to 56 is stored in disc drive bank 14 as a separately identifiable unit and that the manifest file also is stored. Moreover, it is preferable to continue to store one or both of the message digests included in the chunk files themselves or the message digests for the chunk files that are included in the manifest file. In this way, a subsequent corruption in any given chunk can be easily identified. Also, because the manifest file has been retained and the chunks have been stored in their original units, any individual chunk can be easily reloaded or otherwise replaced without having to reload any other chunks or having to make any other significant changes.

Still further, by continuing to store chunks in their original units, it is possible to implement file sharing systems in which the chunks for a particular asset (or composition) are distributed across different physical units that are networked together. Similarly, in such an environment redundant copies of chunks can be stored in such different units. Then, the requisite chunks can be retrieved and reassembled on an as-needed basis.

Paging During Media Loading.

As noted above, one of the ways in which programming content can be loaded into system 10 is through input device 16. For example, in an embodiment where input device 16 includes a DVD reader, multiple DVDs may be individually loaded into and then read by input device 16. This may require separately loading anywhere from 8 to 16 DVDs, which can take a significant amount of time. In addition, when used in a movie theater, the task may have to be performed by a theater employee who also has other responsibilities.

Figure 3:
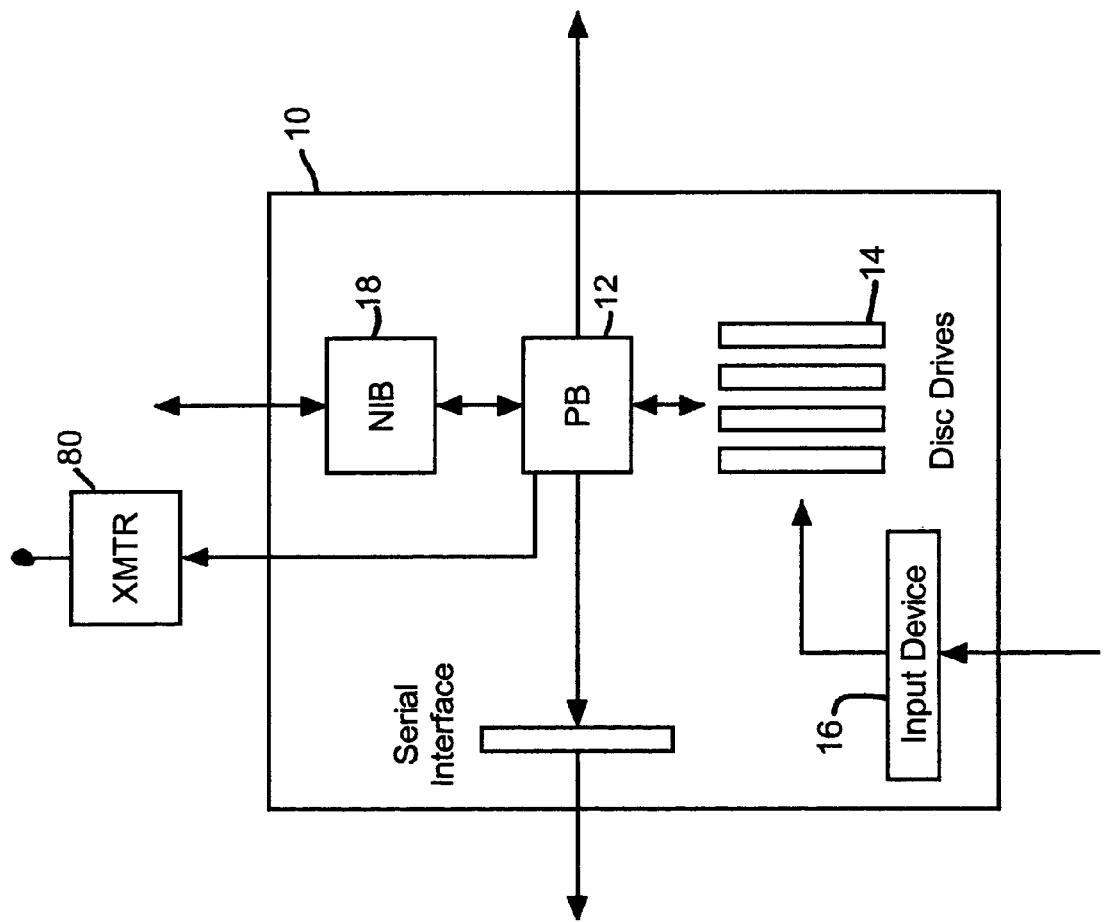
FIG. 3 illustrates an alternate embodiment in which the system of the present invention is provided with a paging transmitter.

This situation is addressed in one embodiment of the present invention as shown in FIG. 3. Specifically, system 10 is provided with a connection to a paging transmitter 80 for receiving instructions from processor board 12 and, in response to such instructions, wirelessly transmitting messages regarding the status of the content-loading operation being performed by system 10. Such paging messages are received by a paging receiver 82 that may be carried by the theater employee who is responsible for loading the programming content into system 10.

Thus, for example, when a DVD is loaded into input device 16 content will be read from the DVD and stored into disc drive bank 14, typically under control of processor board 12. The process steps executed by the CPU on processor board 12 include a step to instruct paging transmitter 80 to send a status message when a specified point in the loading process has been reached. For instance, a status message may be sent when loading is complete. Alternatively, or in addition, a status message may be sent just prior to completion (e.g., when a specified percentage of loading has been completed or when the estimated remaining loading time reaches a specified value). In either case, the responsible person carrying receiver 82 will be alerted that a new DVD should be inserted into system 10. It is noted that the triggering criterion in each instance may be pre-specified or may be user-settable. If pre-specified, the triggering criteria may, for example, be specified in the hardware or software of system 10; alternatively, a triggering code may be embedded within the data being loaded.

In addition to such "loading complete" and/or "loading nearly complete" messages, with the configuration shown in FIG. 3 it is also possible to broadcast other types of messages, such as "loading error" messages and/or messages pertaining to self-diagnostic testing. Still further, status messages pertaining to the playback operation also may be transmitted, such as completion or near-completion of a movie, or various error messages.

Any conventional paging technology may be used. The paging transmitter 80 may be either internal to system 10 or provided as an external device. Also, rather than using a local transmitter, it is possible for system 10 to request a paging message by initiating a dial-up connection using a modem or an Internet or other network connection using network interface board 18 and requesting that a remote device transmit the paging message.

Although the foregoing embodiment pertains to loading of programming content, it should be understood that the foregoing techniques also may be applied to the loading of any other software or data.

Additional Considerations

It should be understood that any of the functionality described above can be implemented in software, hardware, firmware or any combination of these, with the particular implementation being selected based on known engineering tradeoffs. In addition to the above-indicated hardware configurations, the present invention also relates to machine-readable media on which are stored program instructions for performing the methods of this invention. Such media include, by way of example, magnetic disks, magnetic tape, optically readable media such as CDs and DVDs, semiconductor memory such as PCMCIA cards, etc. In each case, the medium may take the form of a portable item such as a small disk, diskette, cassette, etc., or it may take the form of a relatively larger or immobile item such as a hard disk drive, ROM or RAM provided in a computer.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

What is claimed is:

1. A method for facilitating loading of data from a portable medium into a device, said method comprising:

accepting a portable medium encoded with data;

loading the data from the portable medium into a mass storage device; and causing a paging signal to be wirelessly transmitted when a specified portion of said loading has been completed.

2. A method according to claim 1, wherein the specified portion is specified within the data being loaded.

3. A method according to claim 1, wherein the specified portion is user-selectable.

4. A method according to claim 1, wherein the portable medium includes one of a CD and a DVD.

5. A method according to claim 1, further comprising a step of causing a paging signal to be wirelessly transmitted in an event that a loading error occurs.

6. An apparatus for loading of data from a portable medium, said apparatus comprising:

mass storage means for storing large amounts of data on a nonvolatile basis;

means for accepting a portable medium encoded with data;

means for loading the data from the portable medium into said mass storage means; and means for causing a paging signal to be wirelessly transmitted when a specified portion of said loading has been completed.

7. An apparatus according to claim 6, wherein the specified portion is specified within the data being loaded.

8. An apparatus according to claim 6, wherein the specified portion is user-selectable.

9. An apparatus according to claim 6, wherein the portable medium includes one of a CD and a DVD.

10. An apparatus according to claim 6, further comprising a means for causing a paging signal to be wirelessly transmitted in an event that a loading error occurs.

11. An apparatus according to claim 6, further comprising means for wirelessly transmitting the paging signal.

12. An apparatus according to claim 6, further comprising a hardware interface means for communicating a signal to a transmitter, the signal instructing the transmitter to send the paging signal.

13. A computer-readable medium storing computer-executable process steps for facilitating loading of data from a portable medium into a device, said process steps comprising steps to:

accept a portable medium encoded with data;

load the data from the portable medium into a mass storage device; and cause a paging signal to be wirelessly transmitted when a specified portion of said loading has been completed.

14. A computer-readable medium according to claim 13, wherein the specified portion is specified within the data being loaded.

15. A computer-readable medium according to claim 13, wherein the specified portion is user-selectable.

16. A computer-readable medium according to claim 13, wherein the portable medium includes one of a CD and a DVD.

17. A computer-readable medium according to claim 13, wherein said process steps further comprise a step to cause a paging signal to be wirelessly transmitted in an event that a loading error occurs.

* * * * *